US009945490B2

(12) United States Patent
Dankbaar et al.

(10) Patent No.: US 9,945,490 B2
(45) Date of Patent: Apr. 17, 2018

(54) SMA VALVE FOR CONTROLLING PRESSURIZED AIR SUPPLY TO AN AIR CELL IN A VEHICLE SEAT

(71) Applicant: Kongsberg Automotive AB, Mullsjoe (SE)

(72) Inventors: Frank Dankbaar, Mullsjö (SE); Anders Grönhage, Mullsjö (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 0 days.

(21) Appl. No.: 15/104,081

(22) PCT Filed: Dec. 13, 2013

(86) PCT No.: PCT/EP2013/076507
§ 371 (c)(1),
(2) Date: Jun. 13, 2016

(87) PCT Pub. No.: WO2015/086089
PCT Pub. Date: Jun. 18, 2015

(65) Prior Publication Data
US 2016/0363230 A1 Dec. 15, 2016

(51) Int. Cl.
*F16K 31/00* (2006.01)
*B60N 2/44* (2006.01)
(Continued)

(52) U.S. Cl.
CPC ......... *F16K 31/002* (2013.01); *A61H 23/004* (2013.01); *B60N 2/0244* (2013.01);
(Continued)

(58) Field of Classification Search
CPC .................................................. F16K 31/002
(Continued)

(56) References Cited

U.S. PATENT DOCUMENTS 2,299,404 A * 10/1942 Newton ........... G05D 23/27537
137/485
3,480,040 A 11/1969 Erickson
(Continued)

FOREIGN PATENT DOCUMENTS

CN 101725733 A 6/2010
DE 102 57 549 B3 8/2004
(Continued)

OTHER PUBLICATIONS

International Search Report for Application No. PCT/EP2013/076494 dated Sep. 16, 2014, 2 pages.
(Continued)

*Primary Examiner* — Umashankar Venkatesan
(74) *Attorney, Agent, or Firm* — Howard & Howard Attorneys PLLC

(57) ABSTRACT

SMA valve for controlling pressurized air supply to an air cell in comprising: a valve housing; a valve element (4) which is moveably suspended with respect to a mounting plate (30) in the housing between a closed position and an open position of the valve; a spring element adapted to exert a bias force on the valve element (4) to the closed position; a SMA wire (1) arranged such that shortening of the SMA wire upon exceeding its threshold temperature pulls the valve element to the closed position; a conductor (20) arranged on the valve element (4) in contact with the SMA wire (1) and arranged such that it comes into contact with a conducting surface (34) on the mounting plate (30) to close an electrical circuit when the valve element reaches its open position; a control unit arranged to supply electrical power to the SMA wire and to detect closure of the electrical circuit, and arranged to reduce the electrical power supply to the SMA wire when detecting closure of the electrical circuit, characterized in that the suspension (8, 10, 10', 12, 12', 14, 14') of the valve element (4) is arranged such that
(Continued)

the valve element moves parallel to the mounting plate (30) between the closed and open positions, and the conductor (20) is arranged to extend along a first portion (22) parallel to the longitudinal and moving direction of the valve element (4) and along a second portion (24) towards the mounting plate (30) and into a slot (32) formed therein, the conducting surface (34) being located in the slot such that an exposed end of the conductor (20) comes into contact with the conducting surface (34) in the slot (32) when the valve element (4) reaches its open position.

17 Claims, 4 Drawing Sheets

(51) Int. Cl.
| | | |
|---|---|---|
| *A61H 23/00* | (2006.01) | |
| *B60N 2/02* | (2006.01) | |
| *F03G 7/06* | (2006.01) | |
| *G05D 7/06* | (2006.01) | |
| *F16K 31/02* | (2006.01) | |

(52) U.S. Cl.
CPC ........... *B60N 2/448* (2013.01); *B60N 2/4415* (2013.01); *F03G 7/065* (2013.01); *F16K 31/025* (2013.01); *G05D 7/0635* (2013.01)

(58) Field of Classification Search
USPC ................................. 251/11, 129.04, 129.06
See application file for complete search history.

(56) References Cited

U.S. PATENT DOCUMENTS

| | | | |
|---|---|---|---|
| 4,429,552 A | 2/1984 | Reedy | |
| 4,570,851 A | 2/1986 | Cirillo | |
| 4,655,505 A | 4/1987 | Kashiwamura et al. | |
| 4,840,425 A | 6/1989 | Noble | |
| 4,973,024 A | 11/1990 | Homma | |
| 5,127,708 A | 7/1992 | Kishi et al. | |
| 5,135,282 A | 8/1992 | Pappers | |
| 5,345,963 A | 9/1994 | Dietiker | |
| 5,622,482 A | 4/1997 | Lee | |
| 5,669,416 A | 9/1997 | Nusche | |
| 5,787,947 A | 8/1998 | Hertsgaard | |
| 6,024,545 A | 2/2000 | Morioka | |
| 6,116,569 A | 9/2000 | Cox | |
| 6,220,667 B1 | 4/2001 | Wagener | |
| 6,247,678 B1 | 6/2001 | Hines et al. | |
| 6,276,385 B1 | 8/2001 | Gassman | |
| 6,449,434 B1 | 9/2002 | Fuss | |
| 6,464,200 B1 | 10/2002 | Hines et al. | |
| 6,494,225 B1* | 12/2002 | Olewicz | F16K 7/045 137/1 |
| 6,564,824 B2 | 5/2003 | Lowery et al. | |
| 6,918,884 B2 | 7/2005 | Knelsen et al. | |
| 6,972,659 B2 | 12/2005 | Von Behrens et al. | |
| 7,093,817 B2 | 8/2006 | MacGregor et al. | |
| 7,331,563 B2 | 2/2008 | Biehl et al. | |
| 7,363,942 B2 | 4/2008 | Fernandez | |
| 7,484,528 B2 | 2/2009 | Beyerlein et al. | |
| 7,663,811 B2 | 2/2010 | Noda et al. | |
| 7,748,405 B2 | 7/2010 | Ghorbal et al. | |
| 7,911,332 B2 | 3/2011 | Caretta et al. | |
| 8,127,543 B2 | 3/2012 | Von Behrens et al. | |
| 8,382,460 B2 | 2/2013 | Ramunas et al. | |
| 8,570,384 B2 | 10/2013 | Brown et al. | |
| 8,714,199 B2* | 5/2014 | Deperraz | F16K 31/025 137/840 |
| 9,027,903 B2* | 5/2015 | Arekar | F16K 31/025 251/11 |
| 9,462,928 B2* | 10/2016 | Marone | A47L 15/4409 |
| 9,630,560 B2* | 4/2017 | Alacqua | B60R 1/087 |
| 2001/0011414 A1 | 8/2001 | Hines et al. | |
| 2005/0121636 A1 | 6/2005 | Scott | |
| 2007/0023089 A1 | 2/2007 | Beyerlein et al. | |
| 2007/0166170 A1 | 7/2007 | Nason et al. | |
| 2007/0246285 A1 | 10/2007 | Browne et al. | |
| 2008/0018198 A1 | 1/2008 | Sohn et al. | |
| 2008/0251746 A1 | 10/2008 | Riley et al. | |
| 2008/0254346 A1 | 10/2008 | Burstall et al. | |
| 2008/0271559 A1 | 11/2008 | Garscha | |
| 2010/0111733 A1 | 5/2010 | Ramunas et al. | |
| 2010/0222733 A1 | 9/2010 | Schieber et al. | |
| 2011/0039967 A1 | 2/2011 | Wilson et al. | |
| 2011/0166524 A1 | 7/2011 | Preuthun et al. | |
| 2012/0011843 A1 | 1/2012 | Makinson et al. | |
| 2012/0002113 A1 | 2/2012 | Stadelbauer et al. | |
| 2012/0067430 A1 | 3/2012 | Deperraz et al. | |
| 2012/0153043 A1 | 6/2012 | Arekar et al. | |
| 2012/0160334 A1 | 6/2012 | Deperraz et al. | |
| 2012/0199768 A1 | 8/2012 | Love et al. | |
| 2012/0223554 A1 | 9/2012 | Lem et al. | |
| 2013/0002933 A1 | 1/2013 | Topliss | |
| 2013/0162896 A1 | 6/2013 | Kang et al. | |
| 2013/0277580 A1 | 10/2013 | Deperraz | |
| 2014/0060858 A1 | 3/2014 | Johnson | |
| 2014/0125042 A1 | 5/2014 | Köpfer | |
| 2015/0202993 A1* | 7/2015 | Mankame | B60N 2/002 297/284.4 |
| 2016/0018016 A1* | 1/2016 | Dankbaar | B60N 2/4415 251/129.01 |

FOREIGN PATENT DOCUMENTS

| | | |
|---|---|---|
| DE | 10 2005 060217 A1 | 7/2006 |
| DE | 10 2008 021 444 A1 | 11/2009 |
| EP | 2 078 891 A2 | 7/2009 |
| EP | 2 239 486 B1 | 10/2011 |
| EP | 2 312 187 B1 | 11/2012 |
| JP | S 62-167981 U | 10/1987 |
| JP | H07 71628 A | 3/1995 |
| JP | 2006-037786 A | 2/2006 |
| WO | WO 01/33306 A2 | 5/2001 |
| WO | WO 2007/030417 A2 | 3/2007 |
| WO | WO 2015/086088 A1 | 6/2015 |
| WO | WO 2015/086089 A1 | 6/2015 |
| WO | WO 2015/086094 A1 | 6/2015 |
| WO | WO 2015/185132 A1 | 12/2015 |

OTHER PUBLICATIONS

International Search Report for Application No. PCT/EP2013/076593 dated Oct. 2, 2014, 3 pages.
International Search Report for Application No. PCT/EP2014/061614 dated Jan. 30, 2015, 4 pages.
English language abstract and computer-generated English translation for DE 10 2008 021 444 A1 extracted from espacenet.com database on Nov. 15, 2016, 11 pages.
Computer-generated English language translation for JPS 62-167981 U extracted from PAJ database dated Nov. 5, 2016, 3 pages.
English language abstract and machine-assisted English language translation of DE 10 2005 060217 A1 extracted from www.espacenet.com dated Jun. 8, 2016; 8 pages.
English language abstract and machine-assisted English language translation of DE 102 57 549 B3 extracted from www.espacenet.com dated Jun. 11, 2016; 8 pages.
International Search Report for International Application No. PCT/EP2013/076507 dated Sep. 16, 2014; 4 pages.
English language abstract and machine-assisted translation of Japanese Publication No. JP H07 71628 A extracted from www.espacenet.com dated Aug. 15, 2017; 7 pages.
English language abstract and machine-assisted English language translation of Japanese Publication No. JP 2006-037786 A extracted from www.espacenet.com dated Aug. 15, 2017; 8 pages.
English language abstract and machine-assisted English language translation of Chinese Publication No. CN 101725733 A extracted from www.espacenet.com dated Aug. 15, 2017; 5 pages.

(56) References Cited

OTHER PUBLICATIONS

English language abstract and machine-assisted English language translation of European Patent No. EP 2 312 187 A1 extracted from www.espacenet.com dated Dec. 21, 2015; 7 pages.

International Search Report for International Patent Application No. PCT/IB2013/000307 dated Nov. 11, 2013; 4 pages.

Shkolnikov, Viktor, Ramunas, John, and Santiago, Juan G., "A Self-priming, roller-free, miniature, peristaltic pump operable with a single, reciprocating actuator", *Sens Actuators A Phys*.May 2010 ; 160(1-2): 141-146. doi:10.1016/j.sna.2010.04.018, © 2010 Elsevier B.V.; 16 pages.

Website: http://www.takasago-fluidics.com/products_valve/others/SMV/, Shape Memory Alloy Valve SMV Series, Jul. 9, 2014; 2 pages.

* cited by examiner

SMA VALVE FOR CONTROLLING PRESSURIZED AIR SUPPLY TO AN AIR CELL IN A VEHICLE SEAT

RELATED APPLICATIONS

This application is the National Stage of International Patent Application No. PCT/EP2013/076507, filed Dec. 13, 2013, the entire contents of which are hereby incorporated by reference.

The present invention relates to a SMA valve for controlling pressurized air supply to an air cell in a vehicle seat comprising: a valve housing; a valve element which is moveably suspended with respect to a mounting plate in the housing between a closed position in which it is in sealing abutment with a valve seat establishing a closed state of the valve, and an open position in which the valve element is moved away from the valve seat corresponding to an open state of the valve; a spring element adapted to exert a bias force on the valve element urging it to the closed position; a SMA wire extending between the mounting plate and the valve element and arranged such that shortening of the SMA wire upon exceeding its threshold temperature exerts a force on the valve element which pulls the valve element away from the closed position against the bias force of the spring element; a conductor arranged on the valve element in contact with the SMA wire and arranged such that it comes into contact with a conducting surface on the mounting plate to close an electrical circuit when the valve element reaches its open position; a control unit arranged to supply electrical power to the SMA wire for opening the valve and to detect closure of the electrical circuit, and arranged to reduce the electrical power supply to the SMA wire when detecting closure of the electrical circuit.

Drivers and passengers of motor vehicles, especially when driving long distances, often experience discomforts caused by long time static posture when seated in the vehicle seat. This is not only felt as being uncomfortable and causing for example back pain but may also lead to permanent impairment of health, in particular for professional drivers such as taxi, truck and bus drivers. To provide a remedy the automotive industries since some time offers vehicle seats with adjustable lumbar supports and bolsters and with integrated massage systems in the back seat which are based on pneumatic actuation. The lumbar supports and bolsters in seats are adjusted by inflating air cells by supplying pressurized air to the air cells. Pressurized air supply is terminated and the air cells are closed once the lumbar support and bolsters reached their desired inflation state. In massage systems series of air cells in the seat back are sequentially inflated and deflated to provide a massage effect.

In a massage system for a vehicle seat there is a controllable valve upstream of each air cell to permit to control the inflation/deflation of each cell individually, and further valves for controlling venting. Since the number of air cells in a massage system is considerable, the number of valves is correspondingly large. Similarly, in vehicle seats having adjustable lumbar supports and bolsters valves are present to open the air cells for inflation and to close the cells at the desired inflated state.

Solenoid valves are technically well suited to be utilized as controllable valves in massage system and in lumbar support and bolster systems for vehicle seats, but such valves are relatively expensive, physically large and heavy and therefore not preferred for applications such as in vehicle seats where valves are employed in large numbers for example in massage systems.

Another type of controllable valve is the so called SMA valve, wherein SMA stands for "shape memory alloy". A SMA valve comprises a housing, a plunger as valve element, a spring urging the plunger to a closed position in a valve seat, and an actuator capable of acting on the plunger such that the actuator upon activation exerts a force on the plunger which moves the plunger away from the valve seat to an open position and keeps it there as long as the activator remains activated. In this case the actuator comprises a metal wire made of a shape memory alloy. Such shape memory alloy changes its microscopic structure at a threshold temperature such that a SMA wire shortens upon exceeding the threshold temperature. In particular, a SMA material at room temperature is in the state of a metal with martensitic properties, whereas the structure transitions at a threshold temperature of about 80° C. into an austenitic structure. Due to this transition a SMA wire shortens, wherein the shortening provides the force acting on the plunger to move it into the opened position. Actuation of the SMA valve is controlled by selectively supplying an electrical current to the SMA wire to heat it up to the threshold temperature and to keep it at such temperature for the desired activation cycle, whereafter electrical power supply to the SMA wire is terminated to let the SMA wire cool down below the threshold temperature.

SMA valves have some advantages for applications such as in massage systems and lumbar supports and bolsters in vehicle seats since they can be designed to have low weight, the valve are almost completely quite in operation and may be provided at relatively low costs.

A SMA valve is for example described in DE 10 2005 060 217 A1. This valve has a housing in which a plunger as a valve element is moveably suspended, wherein the plunger is axially guided in a mounting plate and extends further through openings in a shield wall with its longitudinal and moving direction perpendicular to the mounting plate. A SMA wire is fixed with its two opposite ends to the mounting plate at spaced apart points, and is in its central portion fixed to the plunger at a level elevated over the mounting plate such that the SMA wire has the shape of an isosceles triangle wherein the SMA wire portions extending from the central portion in opposite directions form the legs of equal length, and the mounting plate forms the opposite side of the triangle. When the SMA wire is heated up by supply of electrical power to exceed the threshold temperature, the SMA wire shortens which results in shortening of the two legs of the triangle which in turn moves the apex where the SMA wire is connected to the plunger closer to the mounting plate, whereby the plunger is moved towards the mounting plate to the open state of the valve. The diameter of the SMA wire is usually very small, typically less than 0.1 mm. For this reason care has to be taken that the wire is not overheated and destroyed by melting. In a first phase of electrical power supply, the supply level is relatively high to quickly reach the threshold temperature, whereafter the level of electrical power supply is reduced to avoid a overheating of the wire. For this purpose there is an end switch which is actuated by the plunger when the plunger reaches the open position, and the control unit is arranged to reduce the electrical power supply after actuation of the end switch. The end switch is located below the mounting plate so that the lower end of the plunger actuates the end switch when the plunger reaches the open position. The extension of the SMA wire forming an isosceles triangle together with the mounting plate leads to relatively large lateral dimensions of the valve because the angle between the legs is in the embodiment shown rather large and preferably 145° so that the distance between the opposite end points of the wire where it is fixed to mounting plate is relatively large.

The above-described SMA valve design is furthermore space consuming in the direction perpendicular to the mounting plate because the plunger extends with its longitudinal axis perpendicular to the mounting plate and moves in this direction.

The preamble of claim 1 is based on a SMA valve as described above with referenced to DE 10 2005 060 217 A1 except for a different end switch. In this case the plunger is a plastic member with a gold plated surface which forms a conductor along the plunger. The SMA wire is in contact with a top surface of the plunger, and when the plunger reaches its open end position a lower end surface of the gold plated plunger comes into contact with a conducting surface on the mounting plate to close an electrical circuit. This closure of the circuit is detected by the control unit which in response lowers the electrical power supply to the SMA wire.

It is an object of the present invention to provide a compact SMA valve with a reliable end switch function.

This object is achieved by a SMA valve comprising the features of claim 1. Preferred embodiments of the invention are set out in the dependent claims.

According to the invention the valve element is suspended such that it moves parallel to the mounting plate between the closed and open positions. The conductor is arranged to extend along a first portion parallel to the longitudinal and moving direction of the valve element and to extend along a second portion towards the amounting plate and into a slot formed therein, the conducting surface being located in the slot such that an exposed end of the conductor comes into contact with the conducting surface in the slot when the valve element reaches its opened position.

In this manner a very compact design can be achieved since the valve element does not extend with its longitudinal direction perpendicular to the mounting plate, but is disposed with its longitudinal axis and its moving direction parallel to the mounting plate. In order to achieve a save end switch function in this configuration, the conductor extends along a first portion along the valve element and parallel to its longitudinal and moving direction and in a second portion at an angle thereto and towards the mounting plate such that it extends into a slot formed in the mounting plate. A side wall of the slot is provided with a conducting surface which is disposed such that the exposed end portion of the conductor comes into contact with the conducting surface to close the electrical circuit when the valve element reaches the opened position.

According to a preferred embodiment the valve element is suspended above the mounting plate by a parallelogram suspension having two parallel connecting links connecting the valve element to a mounting body which in turn is connected to the mounting plate. The connecting links are located at a distance from each other in moving direction of the valve element. The first connecting link is connected to the mounting body by a first hinge and to the valve element by a first valve element hinge; the second connecting link is connected to the mounting body by a second hinge and to the valve element by a second valve element hinge. The connecting links are arranged such that they pivot over an angular range with respect to the longitudinal direction of the valve element and its moving direction when the valve element moves between its closed and open positions, wherein said angular range includes a 90° angle between the connecting links and said longitudinal and moving direction of the valve element. In other words the movement of the valve element from the closed to the open position and vice versa corresponds to a pivotal movement of the connecting links over an angular range around 90°. If this angular range around 90° is sufficiently small this arrangement ensures that the movement of the valve element between the closed and open position and vice versa is to a good approximation a rectilinear movement.

The movement of the valve element is rectilinear in good approximation since the connecting links (if longitudinal and movement direction of the valve element are vertical) moves over an angular range around its horizontal orientation in which it is perpendicular to the direction of movement and to the longitudinal axis of the valve element such that the movement of the valve element is to a good approximation a rectilinear vertical movement. For example, the connecting links may have a length of 9 mm, the distance of travel of the valve element from the closed to the open position may be 1 mm. If the connecting links are perpendicular to the valve element in the closed position thereof, they pivot over a range of about 6° during the movement of the valve element 1 mm backwards to the open position. The deviation of the movement of the valve element from a rectilinear movement in this example is less than 0.05 mm (displacement perpendicular to the longitudinal direction and main moving direction component of the valve element) which is small compared to the travel distance of 1 mm and may be neglected to a good approximation. This main moving direction is referred to as the moving direction of the valve element herein.

A further advantage of the parallelogram suspension is that no guiding or bearing surfaces in sliding contact are needed for suspension of the valve element so that there is no frictional resistance against the movement of the valve element.

In a preferred embodiment the parallelogram suspension and the valve element are integrally formed in one piece, i.e. the mounting body, the first connecting link, the second connecting link, the valve element and the hinges are integrally formed of plastic material. In this case the first and second hinges as well as the first and second valve element hinges are solid state hinges or flexure hinges, each having a zone of weakened material thickness. Such integrated component can be formed in a very cost efficient manner, for example by injection moulding. Furthermore, the production costs are low because no steps for assembling of components of the suspension are necessary since the entire component is formed as a single piece. Such integrated component may be produced with very low tolerances and will not exhibit any play between internal components.

In a preferred embodiment the SMA wire extends along the valve element in a first rectilinear portion to a deflection means and in this first portion the SMA wire is oriented with respect to the movement direction of the valve element when moving from the closed to the open position at an angle which is smaller than 90°; such orientation is necessary so that shortening of the SMA wire results in a force component parallel to the moving direction of the valve element and pulling it away from the closed position. From the deflection means the SMA wire extends in a second portion at an angle with respect to the longitudinal and movement direction of the valve element which is smaller than 45°, for example parallel to the longitudinal and movement direction of the valve element. This arrangement of the SMA wire reduces the lateral extension perpendicular to the longitudinal and movement direction of the valve element.

In a preferred embodiment the deflection means may be provided by a protrusion on the mounting body including a groove in which the SMA wire is routed. The SMA wire may slide in the groove in its longitudinal direction to enable shortening of the SMA wire, and vice versa its extension once its temperature decreases below the threshold temperature.

In a preferred embodiment the conductor is an elongated metal element which is moulded into the valve element with two exposed areas of the conductor, the first exposed area being in a groove which is formed around the valve element on its side facing away from the mounting plate, the SMA wire extending through said groove in contact with the first exposed area of the conductor, wherein the second exposed area of the conductor is formed by a protruding end portion of the metal element deflected towards the mounting plate and extending into the slot therein.

In a preferred embodiment the valve element is provided with an angled lateral extension extending towards the mounting plate and enclosing the conductor along part of its second portion towards the mounting plate. By such extension the conductor is protected and isolated except for the two exposed areas, and is in this manner protected against inadvertent or accidental contacts with other conduction elements. The lateral extension of the valve element may be integrally formed with the valve element and the remaining components of its suspension.

In a preferred embodiment the SMA wire extends from a first fixation point where it is fixed with respect to the mounting plate along said second portion to the deflection means, further along said first portion to the valve element where it is guided in the groove around the valve element to its opposite side where the SMA wire is extending in a symmetrical manner along in opposite first portion to an opposite deflection means and from there along an opposite second portion to an opposite fixation point where it is fixed with respect to the mounting plate. This arrangement permits a rather compact design with only very little space for the SMA wire needed in direction perpendicular to the longitudinal and movement direction of the valve element since both SMA wire portions extend only on one side of the valve element, and since on each side the SMA wire is after a first portion deflected to a direction extending closer to the longitudinal and movement direction of the valve element.

The invention will in the following be described with reference to the drawings, in which.

The SMA valve comprises a housing (not shown) in which a pressure chamber is located. The housing comprises a valve port (not shown) which is supplied with pressurized air. The valve element 4 is, when it is in the closed position, in sealing contact with its sealing tip portion 6 in abutment on the valve seat formed on the inner end of the valve port so that the valve is closed and no pressurized air is entering the pressure chamber. The pressure chamber has an output port through which pressurized air is passed on when the valve element is in its open position with its sealing tip portion 6 lifted oft the valve seat at the inner end of the input port.

Figure 1:
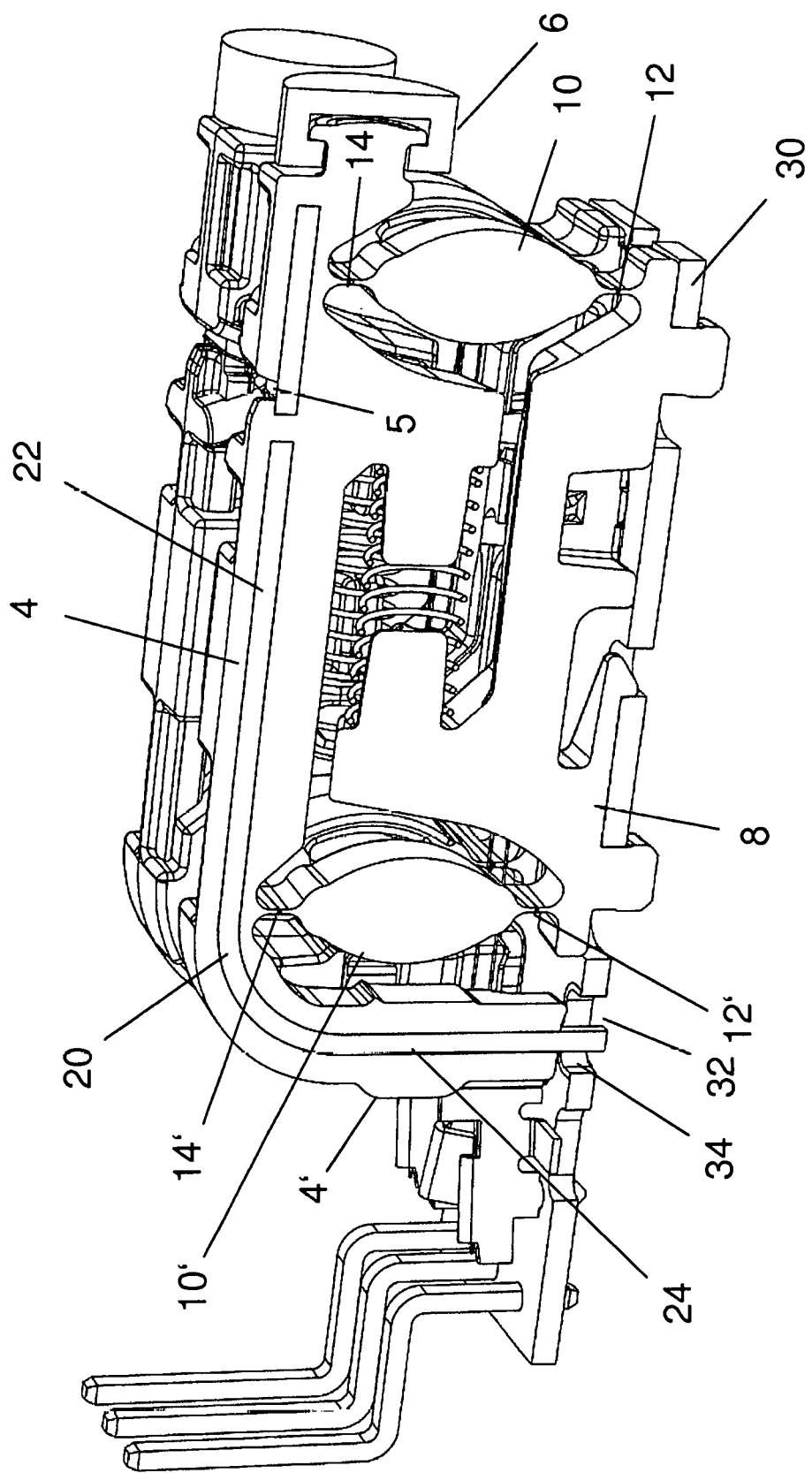
FIG. 1 shows a perspective, cut open view of a valve element with its suspension, wherein a tandem arrangement of two such valve elements on a mounting plate is shown.

In FIG. 1 the valve element 4 in front is shown cut open in the middle. The valve element 4 in the form of a plunger is suspended on a mounting plate 30 by a parallelogram suspension, which mounting plate in turn is to be fixed in the valve housing. This suspension includes a mounting body 8 fixed on the mounting plate 30. The mounting plate may have the form of a printed circuit board. The mounting body 8 may be fixed by pins extending therefrom which are inserted and fixed in complementary holes in the mounting plate 30.

Two parallel connecting links 10, 10' are connecting the valve element 4 to the mounting body 8. The connections of the connecting links 10, 10' to the mounting body 8 are provided with hinges 12, 12'. Also the connections of the connecting links 10, 10' to the valve element 4 are provided with hinges 14, 14'. In this embodiment the valve element and its suspension are integrally formed as one piece of plastic material, wherein the hinges 12, 12', 14, 14' are formed as solid state hinges or flexure hinges, each including a zone of weakened material thickness.

Figure 2:
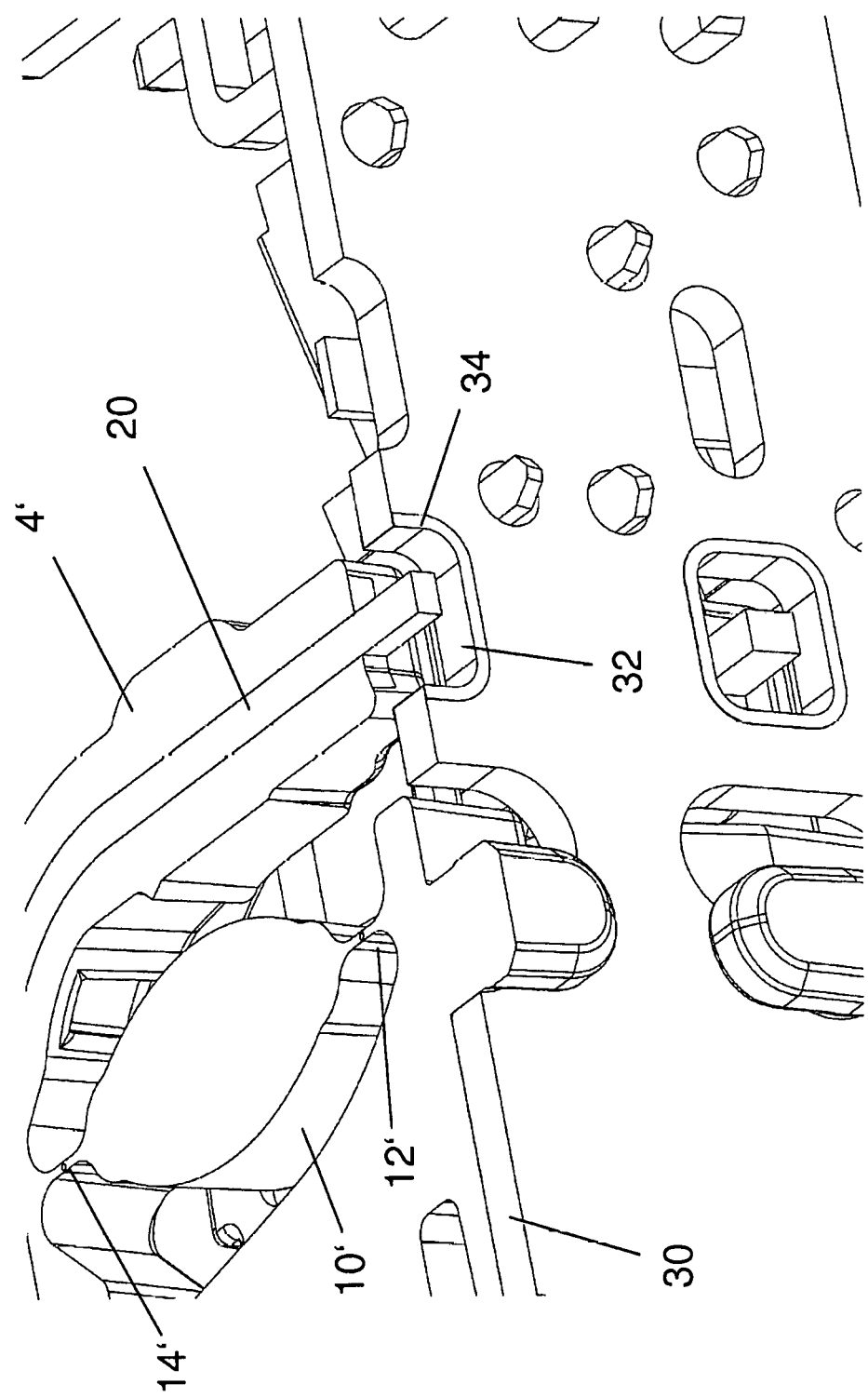
FIGS. 2 and 3 show two detailed views of the valve element and a part of the mounting plate including the slot, wherein the valve element is shown cut open to illustrate the extension of the conductor therein.
Figure 4:
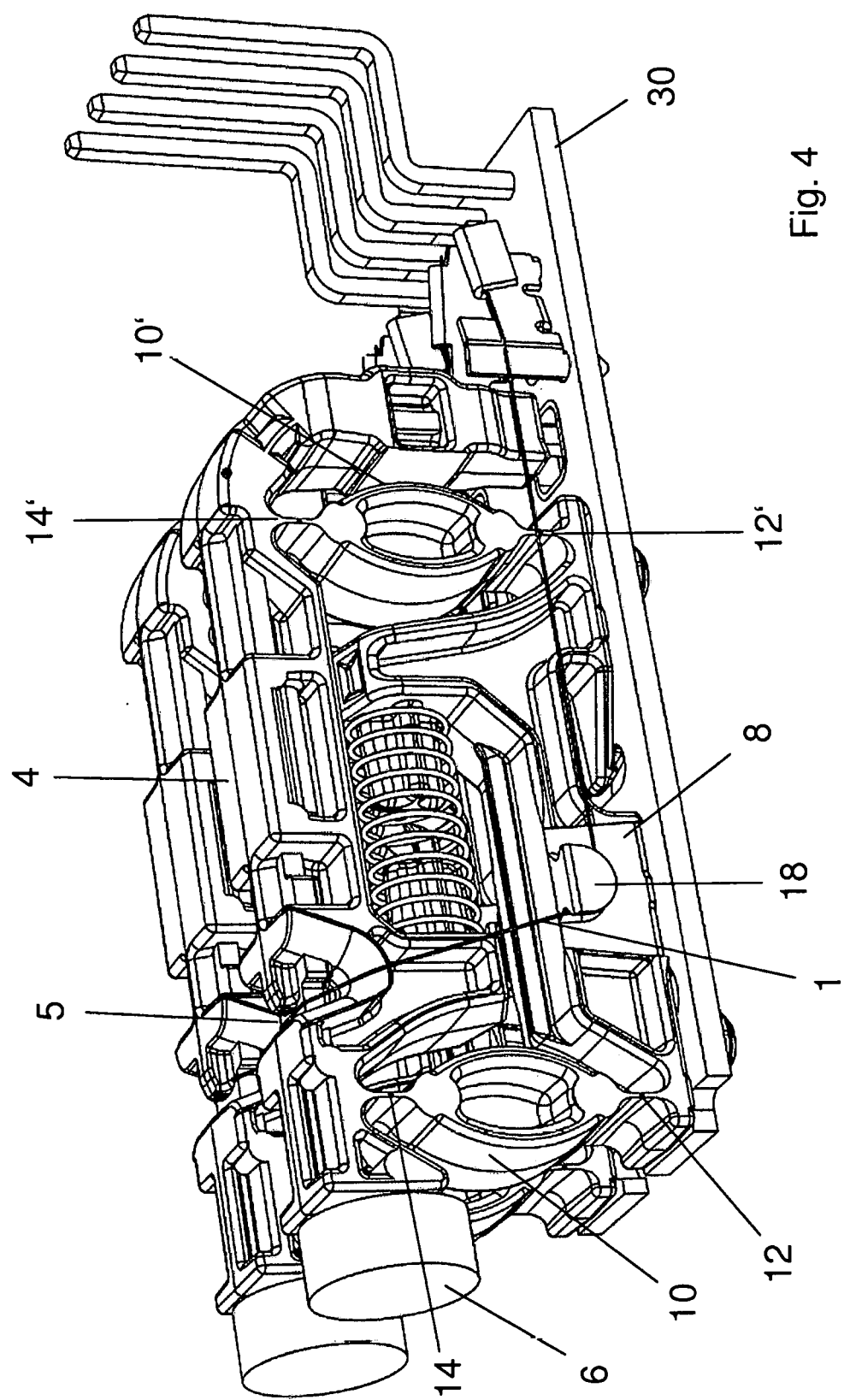
FIG. 4 shows a perspective view of this embodiment.

The position of the valve element shown in FIGS. 1, 2, and 4 corresponds to the closed position of the valve element. In this embodiment the connecting links 10, 10' are oriented perpendicular to the longitudinal direction and movement direction of the valve element 4 when the valve element is in its closed position. The length of the connecting links in this embodiment is 9 mm; if the plunger moves from its closed to its open position 1 mm in longitudinal direction, the connecting links 10, 10' pivot by about 6°. This pivotal movement in an angular range of about 6° with respect to the perpendicular orientation is sufficiently small so that the movement of the valve element 4 may to a good of approximation be considered as a linear movement.

Inside of the valve element conductor 20 is extending. Conductor 20 extends from a front portion of the valve element 4 close to its sealing tip 6 along a first portion 22 in longitudinal direction of the valve element 4, and is then extending over a angled second portion 24 towards the mounting plate 30. Valve element 4 includes a lateral extension 4' which encloses the second portion 24 of the conductor 20 along the major part of its extension towards the mounting plate, wherein only the end portion of the second portion 24 of the conductor 20 is exposed.

Figure 3:
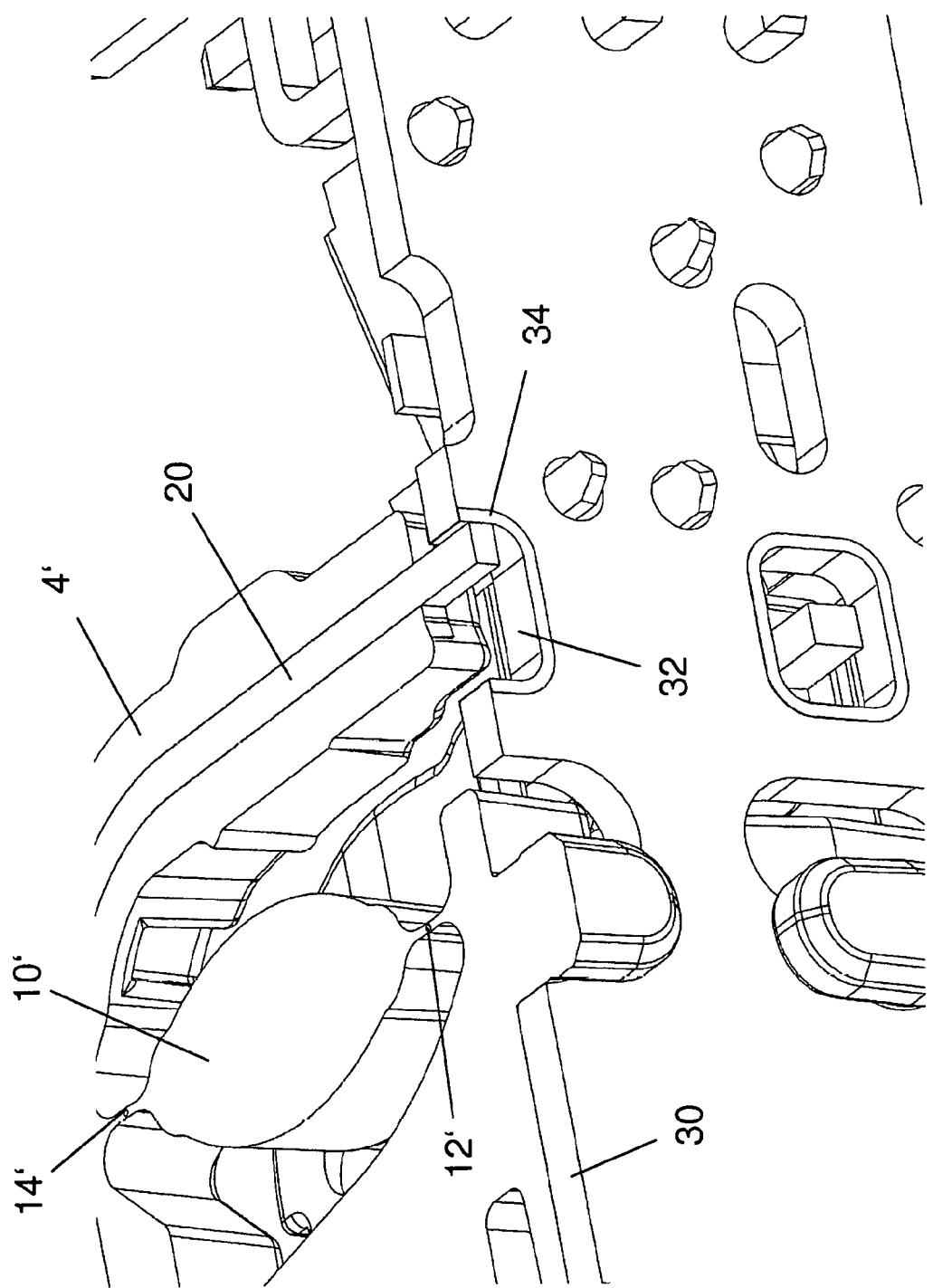

This exposed end portion of the conductor 20 extends into a slot 32 formed in the mounting plate 30 which is shown in more detail in the detailed views of FIGS. 2 and 3.

The slot is arranged such that the exposed end portion of the conductor 20 is located at a distance to any side wall portion of the slot when the valve element 4 is in its closed position. When valve element 4 is driven by the shortening of SMA wire 1 to its open position the exposed lower end portion of the conductor 20 makes a corresponding movement in the slot 32 in rearward direction. The slot 32 is disposed and arranged such that the exposed end part of the conductor 20 comes into contact with the conducting surface in the rearward end side wall 34 of the slot. The control unit of the SMA valve which may include a microprocessor is arranged to detect the closure of the circuit which is effected by the contact between the conductor 20 and the conducting surface 34 at the end side wall of the slot.

In order to ensure that such contact is established when the valve element 4 reaches its open position the slot 32 and its conducting end surface 34 may be arranged and disposed such that the exposed end portion of the conductor comes into abutting contact with a certain force on the conducting surface end wall 34 of the slot 32. In such arrangement it is actually the conductor 20 which terminates the rearward movement of the valve element 4 and the conducting end surface of the slot acts as a stop surface. In such arrangement it is ensured that the exposed end portion of the conductor 20 comes into contact with the conducting surface at the end wall of the slot in any case, even if there are any production tolerances in the relative positioning between the slot 32 in the mounting plate 30 and the remaining components of the valve element 4 and its suspension.

FIG. 4 is a perspective view of a tandem valve element arrangement mounted on a mounting plate 30. As can be seen an expansion spring is mounted to act between the valve element 4 and the mounting body 8 to urge the valve element 4 to the closed position shown in FIG. 4. The SMA wire 1 is fixed with one of its ends on a component fixed on the mounting plate 30 and extends parallel to the longitudinal and moving direction of the valve element 4 to a deflection means 18 which is formed by a protrusion on the mounting body 8 with a groove in which the SMA wire 1 is guided and deflected to extend at an angle of less than 90° to the movement direction of the valve element; in the embodiment shown the angle of the SMA wire 1 in the first portion is about 70° with respect to the movement direction of the valve element 4. The SMA wire 1 further extends through a groove 5 formed in the upper side of the valve element 4 facing away from the mounting plate 30. In this groove an exposed part of the conductor 20 is accessible and the SMA wire being guided through groove 5 is in electrical contact with the first exposed area of the conductor 20. The SMA wire extends further in a symmetrical manner on the opposite (not visible) side, i.e. under an angle of less than 90° to the moving direction of the valve element 4 to an opposite deflection means, and from there along a second portion parallel to the movement direction of the valve element 4 to an opposite fixation point where it is fixed to a component connected to the mounting plate 30.

The invention claimed is:

1. A SMA valve for controlling pressurized air supply to an air cell in a vehicle seat comprising:
    a valve housing,
    a valve element which is moveably suspended with respect to a mounting plate in the housing between a closed position in which it is in sealing abutment with a valve seat establishing a closed state of the valve, and an open position in which the valve element is moved away from the valve seat corresponding to an open state of the valve,
    a spring element adapted to exert a bias force on the valve element urging it to the closed position,
    a SMA wire extending between the mounting plate and the valve element and arranged such that shortening of the SMA wire upon exceeding a threshold temperature exerts a force on the valve element which pulls the valve element away from the closed position against the bias force of the spring element,
    a conductor arranged on the valve element in contact with the SMA wire and arranged such that it comes into contact with a conducting surface on the mounting plate to close an electrical circuit when the valve element reaches the open position, and
    a control unit arranged to supply electrical power to the SMA wire for opening the valve and to detect closure of the electrical circuit, and arranged to reduce the electrical power supply to the SMA wire when detecting closure of the electrical circuit,
    wherein the conductor is arranged to extend along a first portion and along a second portion towards the mounting plate and into a slot formed therein, the conducting surface being located in the slot such that an exposed end of the conductor comes into contact with the conducting surface in the slot when the valve element reaches the open position.

2. The SMA valve according to claim 1, wherein the suspension of the valve element is arranged such that the valve element moves parallel to the mounting plate between the closed and open positions, and wherein the conductor is arranged to extend along a first portion parallel to the longitudinal and moving direction of the valve element and along a second portion towards the mounting plate and into the slot formed therein.

3. The SMA valve according to claim 1, wherein the valve element is suspended above the mounting plate which comprises a mounting body connected to the mounting plate, two connecting links extending between the mounting body and the valve element at a distance from each other in moving direction of the valve element, the first connecting link being connected to the mounting body by a first hinge and to the valve element by a first valve element hinge, the second connecting link being connected to the mounting body by a second hinge and to the valve element by a second valve element hinge, wherein the connecting links are arranged such that they pivot over an angular range with respect to the longitudinal direction of the valve element and the moving direction of the valve element when the valve element moves between the closed and open positions, said angular range including an 90° angle between the connecting links and said longitudinal and moving direction.

4. The SMA valve according to claim 3 wherein the mounting body, the first connecting link, the second connecting link, the valve element and the hinges are integrally formed of plastic material and that the first and second hinges as well as the first and second valve element hinges are solid state hinges each having a zone of weakened material thickness.

5. The SMA valve according to claim 4, wherein the conductor is an elongated metal element which is moulded into the valve element with two exposed areas of the conductor, the first exposed area being in a groove which is formed around the valve element on a side facing away from the mounting plate, the SMA wire extending through said groove, and the second exposed area being formed by an end portion of the metal element deflected towards the mounting plate and extending into the slot therein.

6. The SMA valve according to claim 5, wherein the valve element is provided with an angled lateral extension extending towards the mounting plate and enclosing the conductor along part of the second portion.

7. The SMA valve according to claim 6, wherein the SMA wire extends from a first fixation point where it is fixed with respect to the mounting plate along said second portion to the deflection member, along said first portion to the valve element where it is guided in the groove around the valve element to an opposite side where the SMA wire is extending in a symmetrical manner along an opposite first portion to an opposite deflection member and from there along an opposite second portion to an opposite fixation point where fixed with respect to the mounting plate.

8. The SMA valve according to claim 5, wherein the SMA wire extends from a first fixation point where it is fixed with respect to the mounting plate along said second portion to the deflection members, along said first portion to the valve element where it is guided in the groove around the valve element to an opposite side where the SMA wire is extending in a symmetrical manner along an opposite first portion to an opposite deflection member and from there along an opposite second portion to an opposite fixation point where fixed with respect to the mounting plate.

9. The SMA valve according to claim 4, the SMA wire extends along the valve element in a first rectilinear portion to a deflection member at an angle with respect to the longitudinal and movement direction of the valve element when moving from the closed to the open position, which angle is smaller than 90°, and from the deflection member in a second portion at an angle with respect to the longitudinal and movement direction of the valve element that is smaller than 45°.

10. The SMA valve according to claim 3, the SMA wire extends along the valve element in a first rectilinear portion to a deflection member at an angle with respect to the longitudinal and movement direction of the valve element when moving from the closed to the open position, which angle is smaller than 90°, and from the deflection member in a second portion at an angle with respect to the longitudinal and movement direction of the valve element that is smaller than 45°.

11. The SMA valve according to claim 1, wherein the SMA wire extends along the valve element in a first rectilinear portion to a deflection member at an angle with respect to the longitudinal and movement direction of the valve element when moving from the closed to the open position, which angle is smaller than 90°, and from the deflection member in a second portion at an angle with respect to the longitudinal and movement direction of the valve element that is smaller than 45°.

12. The SMA valve according to claim 11, wherein the deflection member are provided by a protrusion on the mounting body around which the SMA wire is routed in a groove.

13. The SMA valve according to claim 12, wherein the SMA wire extends in the second portion parallel to the longitudinal and movement direction of the valve element.

14. The SMA valve according to claim 12, wherein the conductor is an elongated metal element which is moulded into the valve element with two exposed areas of the conductor, the first exposed area being in a groove which is formed around the valve element on a side facing away from the mounting plate, the SMA wire extending through said groove, and the second exposed area being formed by an end portion of the metal element deflected towards the mounting plate and extending into the slot therein.

15. The SMA valve according to claim 11, wherein the SMA wire extends in the second portion parallel to the longitudinal and movement direction of the valve element.

16. The SMA valve according to claim 15, wherein the conductor is an elongated metal element which is moulded into the valve element with two exposed areas of the conductor, the first exposed area being in a groove which is formed around the valve element on a side facing away from the mounting plate, the SMA wire extending through said groove, and the second exposed area being formed by an end portion of the metal element deflected towards the mounting plate and extending into the slot therein.

17. The SMA valve according to claim 11, wherein the conductor is an elongated metal element which is moulded into the valve element with two exposed areas of the conductor, the first exposed area being in a groove which is formed around the valve element on a side facing away from the mounting plate, the SMA wire extending through said groove, and the second exposed area being formed by an end portion of the metal element deflected towards the mounting plate and extending into the slot therein.

* * * * *